US006756005B2

(12) United States Patent
Panek et al.

(10) Patent No.: US 6,756,005 B2
(45) Date of Patent: Jun. 29, 2004

(54) METHOD FOR MAKING A THERMALLY CONDUCTIVE ARTICLE HAVING AN INTEGRATED SURFACE AND ARTICLES PRODUCED THEREFROM

(75) Inventors: Jeffrey Panek, North Kingstown, RI (US); Kevin A. McCullough, North Kingstown, RI (US)

(73) Assignee: Cool Shield, Inc., Warwick, RI (US)

( * ) Notice: Subject to any disclaimer, the term of this patent is extended or adjusted under 35 U.S.C. 154(b) by 0 days.

(21) Appl. No.: 10/225,632

(22) Filed: Aug. 22, 2002

(65) Prior Publication Data

US 2003/0038393 A1 Feb. 27, 2003

Related U.S. Application Data

(60) Provisional application No. 60/314,836, filed on Aug. 24, 2001.

(51) Int. Cl.[7] .......................... B29C 45/14; B29C 45/16; B29C 70/60; B29C 70/76; B29C 70/88
(52) U.S. Cl. ................. 264/255; 264/328.7; 264/328.8; 264/328.18; 428/328; 428/329
(58) Field of Search ............................... 264/104, 105, 264/250, 254, 255, 328.7, 328.8, 328.18; 428/328, 329, 331, 421, 422, 520, 522

(56) References Cited

U.S. PATENT DOCUMENTS

| 4,155,402 A | 5/1979 | Just ............................. 165/46 |
| 4,826,896 A | 5/1989 | Procter ....................... 523/443 |
| 5,011,870 A | 4/1991 | Peterson ..................... 523/220 |
| 5,011,872 A | 4/1991 | Latham et al. .............. 423/440 |
| 5,021,494 A | 6/1991 | Toya .......................... 524/404 |
| 5,045,972 A | * 9/1991 | Supan et al. ................ 361/706 |
| 5,106,540 A | 4/1992 | Barma et al. ............... 252/511 |
| 5,254,500 A | * 10/1993 | AuYeung ..................... 29/827 |
| 5,344,795 A | * 9/1994 | Hashemi et al. ....... 264/272.15 |
| 5,366,688 A | * 11/1994 | Terpstra et al. .............. 419/36 |
| 5,424,251 A | * 6/1995 | Sono et al. ................. 438/127 |
| 5,490,319 A | 2/1996 | Nakamura et al. ........... 29/596 |
| 5,523,049 A | * 6/1996 | Terpstra et al. .............. 419/36 |
| 5,536,568 A | 7/1996 | Teruo ......................... 428/327 |
| 5,580,493 A | 12/1996 | Chu et al. ................... 252/511 |
| 5,681,883 A | 10/1997 | Hill et al. ................... 524/404 |
| 5,945,217 A | * 8/1999 | Hanrahan ................... 428/389 |
| 6,048,919 A | 4/2000 | McCullough ............... 524/404 |
| 6,139,783 A | * 10/2000 | McCullough .............. 264/40.1 |
| 6,214,263 B1 | * 4/2001 | McCullough .............. 264/40.1 |
| 6,251,978 B1 | 6/2001 | McCullough ............... 524/404 |
| 6,540,948 B2 | * 4/2003 | McCullough ............... 264/105 |
| 6,585,925 B2 | * 7/2003 | Benefield .................... 264/255 |

* cited by examiner

*Primary Examiner*—Angela Ortiz
(74) *Attorney, Agent, or Firm*—Barlow, Josephs & Holmes, Ltd.

(57) ABSTRACT

The present invention relates to a method of manufacturing a thermally conductive article having an integrated thermally conductive surface. The method involves molding a first thermally conductive composition to form a body of the article and then molding a second thermally conductive composition to form an integrated surface on the body of the article. The integrated thermally conductive surface can interface with a heat-generating device (e.g., an electronic part) to dissipate heat from the device. The invention also encompasses thermally conductive articles produced by this method.

15 Claims, 2 Drawing Sheets

METHOD FOR MAKING A THERMALLY CONDUCTIVE ARTICLE HAVING AN INTEGRATED SURFACE AND ARTICLES PRODUCED THEREFROM

CROSS-REFERENCE TO RELATED APPLICATIONS

This application is related to and claims priority from earlier filed provisional patent application No. 60/314,836 filed Aug. 24, 2001.

BACKGROUND OF THE INVENTION

The present invention relates to a method of manufacturing a thermally conductive article having an integrated surface and the articles produced by such a method. The integrated thermally conductive surface can interface with a heat-generating device (e.g., an electronic component) to dissipate heat from the device.

Electronic devices such as semiconductors, microprocessors, and circuit boards can generate a tremendous amount of heat that must be removed in order for the device to operate effectively. The industry uses thermally conductive compositions to dissipate heat from such electronic components. Typically, such compositions comprise a base polymer matrix and thermally conductive filler material.

For example, McCullough, U.S. Pat. No. 6,251,978 discloses a thermally conductive composition comprising a polymer base matrix (preferably a liquid crystal polymer) and thermally conductive fillers (e.g., aluminum, alumina, copper, magnesium, brass, carbon, and boron nitride).

Conventional thermally conductive compositions can be used in a variety of ways. For example, a heat-generating device (e.g., electronic part) and an adjacent heat-dissipating article (e.g., heat sink) first are secured together by clips, screws, or other mechanical means. Thermally conductive pastes or greases comprising polysiloxane oils loaded with fillers are then smeared onto these components. The thermally conductive greases tend to have initially good film-forming and gap-filling properties. For example, the electronic part and heat sink may have irregular mating surfaces causing small gaps to appear in the interface of these components. Thermal greases tend to seep into these gaps bringing the heat sink and heat-generating device into initial contact with each other. However, it has been found that such thermal greases have poor adhesive properties and will ultimately seep out. This seepage causes air voids to form between the two surfaces resulting in hot spots. Moreover, the mechanical fasteners used to secure the devices may exert excessive pressure and accelerate the seepage. The seeping polysiloxane oils can evaporate and re-condense on sensitive parts of surrounding microcircuits. The re-condensed oils lead to the formation of silicates that can interfere with the microcircuits and cause the microprocessor to fail in operation.

In the case of polysiloxanes and thermoplastic polymers, these materials are typically cast in sheet form and die-cut into desired shapes corresponding to the shapes of the heat sink and electronic part. The resulting pre-formed sheet is attached to the surface of the electronic part, and the heat sink is secured by means of clips or screws. These pre-cut, thermally conductive sheets solve the problems associated with the above-described greases. However, an operator may find it difficult to precisely cut the sheets to specific configurations. Thus, the sheets may not have the proper geometry to provide an optimum pathway for transferring heat from the electronic part to the heat sink. Further, the added step of cutting and manually applying the pre-formed sheets adds cost to the assembly process. The sheets may have non-uniform thickness and vary in their effectiveness to transfer heat. Finally, while these sheet materials are suitable for filling undesirable air gaps, they are generally less thermally conductive than the heat sink member. Thus, these sheets can detract from the overall thermal conductivity of the assembly.

In view of the foregoing problems, it would be desirable to have a method for making a thermally conductive article having an integrated thermally conductive surface, where no further processing or tooling is required to produce the final shape of the article. In addition, the article should form an intimate interface with the heat-generating device and effectively dissipate heat from the device. The present invention provides such a method. This invention also encompasses the articles produced by such a method.

SUMMARY OF THE INVENTION

This invention relates to a method of making a thermally conductive article having an integrated thermally conductive surface. The method comprises the steps of: a) providing two molding members in an aligned relationship, wherein a mold cavity is located between the members, b) injecting a first molten thermally conductive composition into the cavity to form a molded body, c) removing a molding member to expose a surface of the molded body, d) injecting a second molten thermally conductive composition onto the exposed surface of the molded body, e) cooling the compositions to form an article having a molded body and an integrated thermally conductive surface, and f) removing the article from the mold.

The first composition comprises a base polymer matrix and thermally conductive filler material. A thermoplastic polymer selected from the group consisting of polyethylene, acrylics, vinyls, and fluorocarbons can be used to form the matrix. Preferably, a liquid crystal polymer is used. The polymer matrix preferably constitutes about 30 to about 60% and the thermally conductive filler preferably constitutes about 20 to about 70% by volume of the first composition.

The second composition comprises an elastomer polymer matrix and thermally conductive filler material. The elastomer polymer can be selected from the group consisting of styrene-butadiene copolymer, polychloroprene, nitrile rubber, butyl rubber, polysulfide rubber, ethylene-propylene terpolymers, polysiloxanes, and polyurethanes. Preferably, the elastomer polymer is a polysiloxane.

The filler material for the first and second compositions may be selected from the group consisting of aluminum, alumina, copper, magnesium, brass, carbon, silicon nitride, aluminum nitride, boron nitride, and zinc oxide.

In one embodiment, the first and second compositions each comprise: i) about 30 to about 60% by volume of a polymer matrix (i.e., an elastomer polymer matrix is used for the second composition), ii) about 25 to about 60% by volume of a first thermally conductive filler material having an aspect ratio of 10:1 or greater, and (iii) about 10 to about 15% by volume of a second thermally conductive filler material having an aspect ratio of 5:1 or less.

The present invention also encompasses thermally conductive articles produced in accordance with the foregoing methods. Preferably, the article has a thermal conductivity of greater than 3 W/m° K., and more preferably greater than 22 W/m° K.

BRIEF DESCRIPTION OF THE DRAWINGS

The novel features that are characteristic of the present invention are set forth in the appended claims. However, the preferred embodiments of the invention, together with further objects and attendant advantages, will be best understood by reference to the following detailed description taken in connection with the accompanying drawings in which:

DETAILED DESCRIPTION OF THE PREFERRED EMBODIMENT

Figure 1:
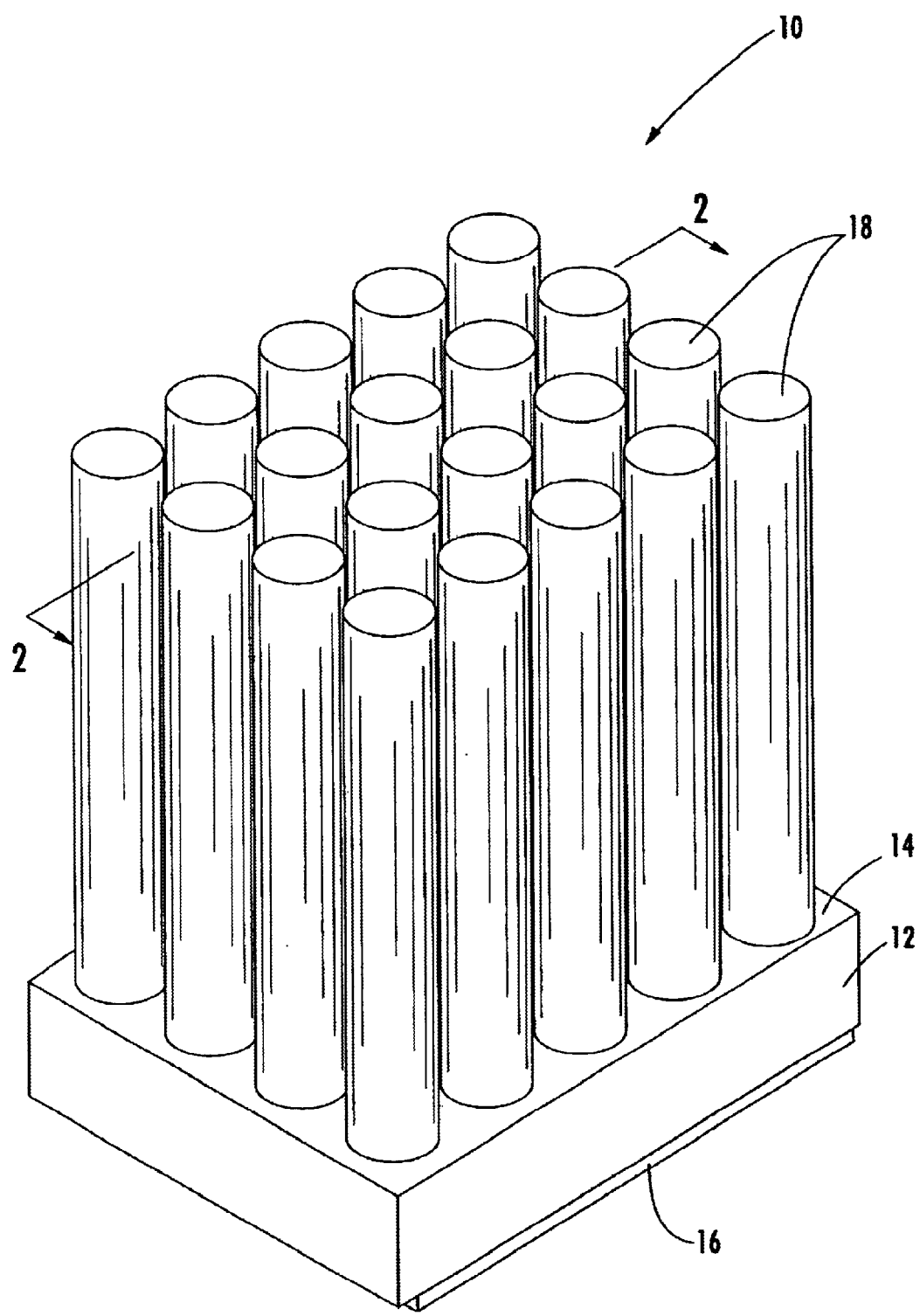
FIG. 1 is a perspective view of a thermally conductive article of the present invention.

The present invention relates to a method of manufacturing a thermally conductive article having an integrated thermally conductive interface and the articles produced by such a method.

A first thermally conductive composition is used to make the body of the thermally conductive article. This first composition comprises a base polymer matrix and thermally conductive filler material. Thermoplastic polymers such as polyethylene, acrylics, vinyls, and fluorocarbons can be used to form the matrix. Alternatively, thermosetting polymers such as epoxies, polyesters, polyimides, and acrylonitriles can be used as the matrix. Although it may be desirable to use an elastomer as the matrix polymer in some instances, such compositions are not preferred. Rather, elastomer polymers are used to make the integrated surface of the article as discussed in further detail below. For the body of the article, it is preferred that a liquid crystal polymer be used due to its highly crystalline nature and ability to provide a good matrix for the filler material. Preferably, the polymer matrix constitutes about 30 to 60% by volume of the first composition.

A second thermally conductive composition is used to make an integrated thermally conductive surface of the article. This second composition comprises an elastomer polymer matrix and thermally conductive filler material. Suitable elastomers include, for example, styrene-butadiene copolymer, polychloroprene, nitrile rubber, butyl rubber, polysulfide rubber, ethylene-propylene terpolymers, polysiloxanes, and polyurethanes. Preferably, the elastomer is a polysiloxane (silicone). It is important that an elastomer polymer be used as the matrix in the second composition. As discussed further below, the elastomeric matrix makes the integrated surface of the article conformable so that it can form an effective interface with the heat-generating device. The elastomeric matrix imparts rubber-like consistency, elasticity and other desirable features to the surface of the article while being highly thermally conductive.

Thermally conductive filler materials are added to the polymer matrices of the first and second composition. Suitable filler materials include, for example, aluminum, alumina, copper, magnesium, brass, carbon, silicon nitride, aluminum nitride, boron nitride, zinc oxide, and the like. Mixtures of such fillers are also suitable. The filler material preferably constitutes about 20 to about 70% by volume of the first composition, and about 20 to about 70% by volume of the second composition. More preferably, the filler material constitutes less than 60% of each composition.

The filler material may be in the form of granular powder, whiskers, fibers, or any other suitable form. The granules can have a variety of structures. For example, the grains can have flake, plate, rice, strand, hexagonal, or spherical-like shapes. The filler material may have a relatively high aspect (length to thickness) ratio of about 10:1 or greater. For example, PITCH-based carbon fiber having an aspect ratio of about 50:1 can be used. Alternatively, the filler material may have a relatively low aspect ratio of about 5:1 or less. For example, boron nitride grains having an aspect ratio of about 4:1 can be used. Preferably, both low aspect and high aspect ratio filler materials are added to the polymer matrices as described in McCullough, U.S. Pat. Nos. 6,251,978 and 6,048,919, the disclosures of which are hereby incorporated by reference.

In one preferred embodiment, the first and second compositions each comprise: i) about 30 to about 60% by volume of a polymer matrix (i.e., an elastomer polymer matrix is used for the second composition), ii) about 25 to about 60% by volume of a first thermally conductive filler material having an aspect ratio of 10:1 or greater, and (iii) about 10 to about 15% by volume of a second thermally conductive filler material having an aspect ratio of 5:1 or less.

More preferably, the first and second compositions each comprise: i) about 50% by volume of a polymer matrix (i.e., an elastomer polymer matrix is used for the second composition), ii), about 35% by volume of a first thermally conductive filler material having an aspect ratio of at least 10:1, and (iii) about 15% by volume of the second thermally conductive filler material having an aspect ratio of less than 5:1.

The filler material may be electrically conductive for applications where efficient electrical transmission is needed such as for grounding purposes. Particularly, the filler material may be selected so that the composition has a volume resistivity of approximately 0.1 ohm-cm or lower and a surface resistivity of approximately 1.0 ohm or lower. The filler for each composition may be selected according to the application at hand to provide the required thermal conductivity and/or electrical conductivity.

The filler material is intimately mixed with the non-conductive polymer matrix to form the first thermally conductive composition. Preferably, a non-elastomer polymer is used as the matrix for the first composition. To produce the second composition the filler is intimately mixed with the non-conductive elastomer matrix. The same or different filler materials can be used in the first and second compositions. For example, the first composition can comprise a liquid crystal polymer and carbon fiber, while the second composition can comprise a polysiloxane and boron nitride particles. The loading of the filler material imparts thermal conductivity to the compositions. The mixtures can be prepared using techniques known in the art. The ingredients are preferably mixed under low shear conditions in order to avoid damaging the structure of the filler material.

The first composition can be molded into a body of a thermally conductive article using a molding, casting or other suitable process. An injection-molding process is particularly preferred. This process generally involve the steps of: (a) feeding the composition into a heating chamber of an injection-molding machine and heating it to form a molten composition; and b) injecting the molten composition into a mold cavity located between two molding members to form a molded body.

In step (c), one of the molding members is removed to expose a molten surface of the molded body. In step (d), the second thermally conductive composition is then introduced onto this molten surface to form a cohesive structure comprising a molded body and integrated surface. The molten surfaces are brought into intimate contact with each other and mated to form this structure. The compositions are then cooled to form a thermally conductive article having an integrated thermally conductive surface. After, the article is removed from the mold, it can be used in a variety of applications.

Figure 2:
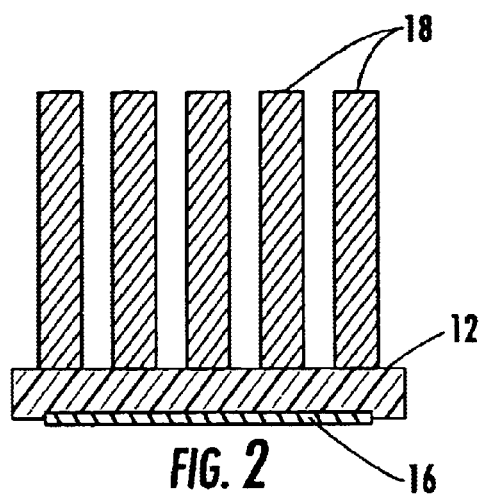
FIG. 2 is a cross-sectional view of a thermally conductive article of the present invention through Line 2—2 of FIG. 1.
Figure 3:
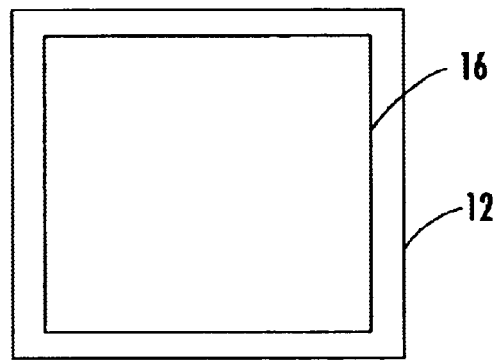
FIG. 3 is a bottom view of a thermally conductive article of the present invention.
Figure 4:
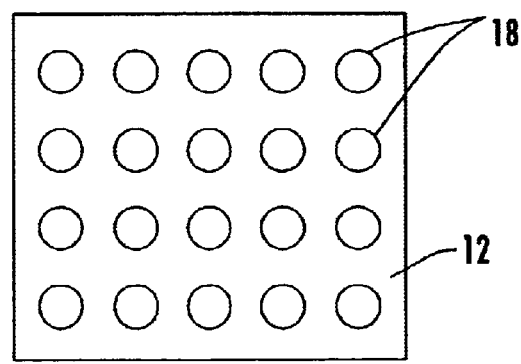
FIG. 4 is a top view of a thermally conductive article of the present invention.

Referring to FIG. 1, a perspective view of the preferred embodiment of the integrally molded thermally conductive article 10 of the present invention is shown. This article 10 includes a base member (body) 12 having a top surface 14 and an integrated thermally conductive surface 16. Projecting upwardly from the top surface are a number of pin structures 18 serving as heat dissipating members for dissipating heat into the ambient air. FIG. 2 is a cross-sectional view through Line 2—2 of FIG. 1 showing the pins 18, base member 12, and integrated surface 16. FIG. 3 is a bottom view of the thermally conductive article 10 showing the integrated surface 16 and base member 12. FIG. 4 is a top view of the thermally conductive article 10 showing pins 18 molded into base member 12.

The shaped article of this invention (including its integrated surface) is thermally conductive. Preferably, the article has a thermal conductivity of greater than 3 W/m° K., and more preferably greater than 22 W/m° K. In addition, the thermally conductive article of this invention is net-shape molded. This means that the final shape of the article and its integrated surface is determined by the shape of the molding members. No additional processing or tooling is required to produce the ultimate shape. Also, since the thermally conductive surface is molded onto the article while the article is still in molten form, no voids or air gaps are created between the two intimate pieces. As a result, the thermally conductive surface can transfer heat efficiently to the thermally conductive body of the article.

If desired, known adhesive materials can be applied either during manufacture or at the time of assembly to adhere the article to a heat-generating device (electronic part).

In practice, the electronic part may have small voids and other minor manufacturing defects on its surface. When conventional heat sinks and electronic parts are brought together, small gaps may appear in the interface between the components. The articles of the present invention solve this problem by providing a tightly conforming interface. The rubber-like integrated surface of the article is highly compressible and conforms to voids located on the surface of the electronic part, thereby creating an effective seal. Further, the thermally conductive surface is substantially non-corrosive and will not creep or bleed-out under applied pressure.

In contrast, many conventional pre-formed films do not have good compressibility resulting in poor intimate contact between the surfaces of the heat sink and heat-generating electronic part.

Since the articles of the present invention have an integrated thermally conductive surface made from an elastomeric polymer, they offer other advantages over conventional pre-formed films. As discussed above, the integrated surface can be molded to any desired final shape. Thus, it is not necessary to die-cut the surface of the articles to obtain a specific structure. This ability to net-shape mold the compositions is beneficial, because die-cutting operations can generate high amounts of material waste.

Further, the integrated surface can vary in thickness and contain numerous recesses and protrusions along its contour. As a result, the surface can span over adjacent heat-generating elements (e.g., memory chips) on a circuit board despite the fact that the elements may be of varying heights. Under uniformly applied pressure, the integrated surface of the article intimately contacts the heat-generating surface of each element and forms an effective thermal interface. This feature is a particular improvement over conventional interfaces that are generically flat in profile and require a separate interface pad for each component.

It is appreciated by those skilled in the art that various changes and modifications can be made to the illustrated embodiments without departing from the spirit of the invention. All such modifications and changes are intended to be covered by the appended claims.

What is claimed is:

1. A method of making a thermally conductive article having an integrated thermally conductive surface, comprising the steps of:
   a) providing two molding members in an aligned relationship, wherein a mold cavity is located between the members,
   b) injecting a first molten thermally conductive composition comprising a non-elastomer polymer matrix and thermally conductive filler material into the cavity to form a molded body,
   c) removing a molding member to expose a surface of the molded body,
   d) injecting a second molten thermally conductive composition comprising an elastomer polymer matrix and thermally conductive filler material onto the exposed surface of the molded body,
   e) cooling the compositions to form an article having an integrated thermally conductive surface, and
   f) removing the article from the mold.

2. The method of claim 1, wherein the first molten thermally conductive composition comprises about 30% to about 60% by volume of a thermoplastic polymer matrix and about 20% to about 70% by volume of a thermally conductive filler material.

3. The method of claim 2, wherein the thermoplastic polymer is selected from the group consisting of polyethylene, acrylics, vinyls, and fluorocarbons.

4. The method of claim 1, wherein the thermoplastic polymer is a liquid crystal polymer.

5. The method of claim 2, wherein the thermally conductive filler material is selected from the group consisting of aluminum, alumina, copper, magnesium, brass, carbon, silicon nitride, aluminum nitride, boron nitride, and zinc oxide.

6. The method of claim 1, wherein the first molten thermally conductive composition comprises about 30% to about 60% by volume of a thermosetting polymer matrix and about 20% to about 70% by volume of a thermally conductive filler material.

7. The method of claim 1, wherein the second molten thermally conductive composition comprises about 30% to about 60% by volume of an elastomer polymer matrix and about 20% to about 70% by volume of a thermally conductive filler material.

8. The method of claim 7, wherein the elastomer polymer is selected from the group consisting of styrene-butadiene copolymer, polychloroprene, nitrile rubber, butyl rubber, polysulfide rubber, ethylene-propylene terpolymers, polysiloxanes, and polyurethanes.

9. The method of claim 8, wherein the elastomer polymer is a polysiloxane.

10. The method of claim 7, wherein the thermally conductive filler material is selected from the group consisting of aluminum, alumina, copper, magnesium, brass, carbon, silicon nitride, aluminum nitride, boron nitride, and zinc oxide.

11. The method of claim 1, wherein the first molten thermally conductive composition comprises i) about 30% to about 60% by volume of a polymer matrix ii) about 25% to about 60% by volume of a first thermally conductive filler material having an aspect ratio of 10:1 or greater, and iii) about 10% to about 15% by volume of a first thermally conductive filler material having an aspect ratio of 5:1 or less.

12. The method of claim 1, wherein the second molten thermally conductive composition comprises i) about 30% to about 60% by volume of a elastomer polymer matrix ii) about 25% to about 60% by volume of a first thermally conductive filler material having an aspect ratio of 10:1 or greater, and iii) about 10% to about 15% by volume of a first thermally conductive filler material having an aspect ratio of 5:1 or less.

13. A thermally conductive article produced in accordance with the method of claim 1.

14. A thermally conductive article produced in accordance with the method of claim 1, wherein the article has a thermal, conductivity of greater than 3 W/m° K.

15. A thermally conductive article produced in accordance with the method of claim 1, wherein the article has a thermal conductivity of greater than 22 W/m° K.

* * * * *